United States Patent [19]

Touzé

[11] Patent Number: 4,904,156
[45] Date of Patent: Feb. 27, 1990

[54] SCREWED ATTACHMENT OF A BODY OF REVOLUTION TO AN ANNULAR FLANGE IN A TURBINE ENGINE

[75] Inventor: Eric Touzé, Le Mee sur Seine, France

[73] Assignee: Societe Nationale d'Etude et de Construction de Moteurs d'Aviation "S.N.E.C.M.A.", Paris, France

[21] Appl. No.: 285,631

[22] Filed: Dec. 16, 1988

[30] Foreign Application Priority Data

Dec. 16, 1987 [FR] France .................................. 87 17548

[51] Int. Cl.⁴ .............................................. F04D 29/54
[52] U.S. Cl. ................................ 415/190; 415/209.2; 415/209.3
[58] Field of Search ............ 415/142, 189, 190, 209.2, 415/209.3, 211.2, 213.1

[56] References Cited

U.S. PATENT DOCUMENTS

| | | | |
|---|---|---|---|
| 2,930,662 | 3/1960 | Henstridge | 415/142 X |
| 3,443,791 | 5/1969 | Sevetz et al. | 415/209.3 X |
| 3,727,660 | 4/1973 | Burge | 415/172 X |
| 3,824,034 | 7/1974 | Leicht | 415/209.2 |
| 4,015,910 | 4/1977 | Harmon et al. | 415/209.2 X |
| 4,190,397 | 2/1980 | Schilling et al. | 415/112 |
| 4,204,803 | 5/1980 | Leger et al | 415/209.2 |
| 4,286,921 | 9/1981 | Donlan et al. | 415/190 X |
| 4,725,199 | 2/1988 | Johnson | 415/189 |

FOREIGN PATENT DOCUMENTS

| | | |
|---|---|---|
| 541764 | 12/1941 | United Kingdom . |
| 2057617 | 4/1981 | United Kingdom . |
| 2071776 | 9/1981 | United Kingdom ................ 415/189 |

Primary Examiner—Everette A. Powell, Jr.
Attorney, Agent, or Firm—Oblon, Spivak, McClelland, Maier & Neustadt

[57] ABSTRACT

An annular fairing forming a bolt guard associated with the heads of screws of an attachment carries, inside thereof and in line with each screw, first cylindrical sockets each comprising two slightly inwardly bent tongues which cooperate with apertures provided in a respective second socket disposed within the first socket and comprising an inturned downstream edge which is impressed over and thereby engaged with peripheral teeth on the head of the respective screw.

6 Claims, 2 Drawing Sheets

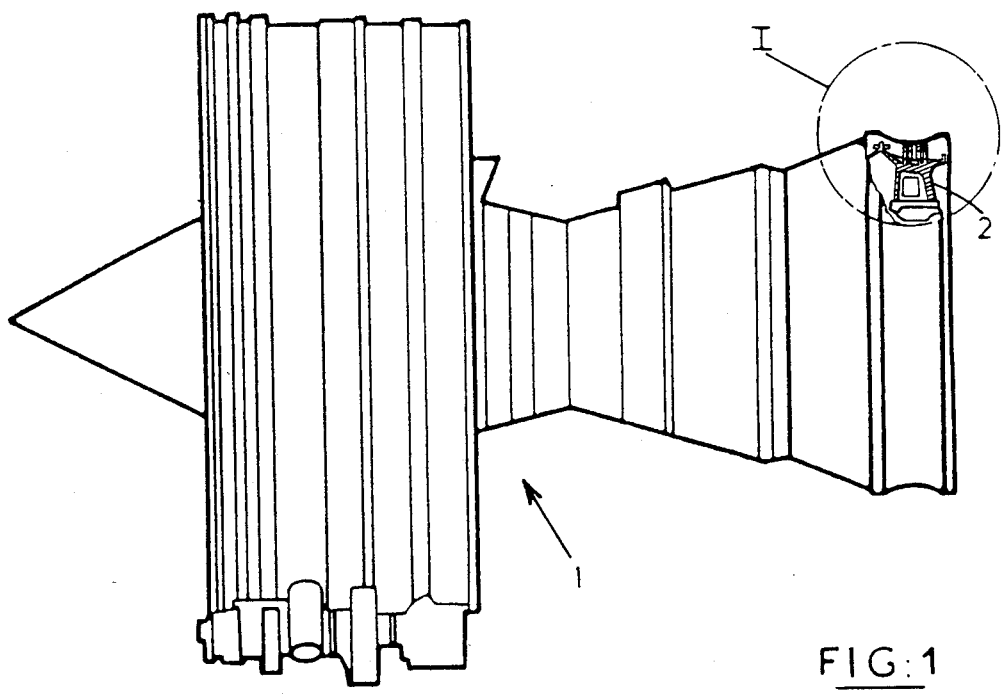
FIG:1
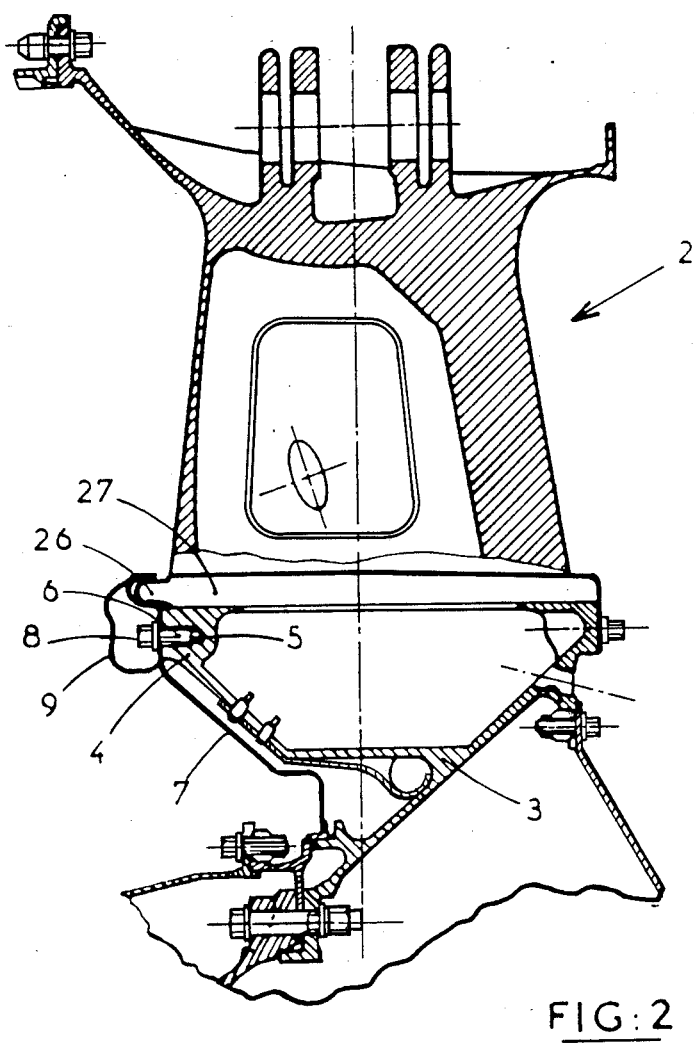
FIG:2

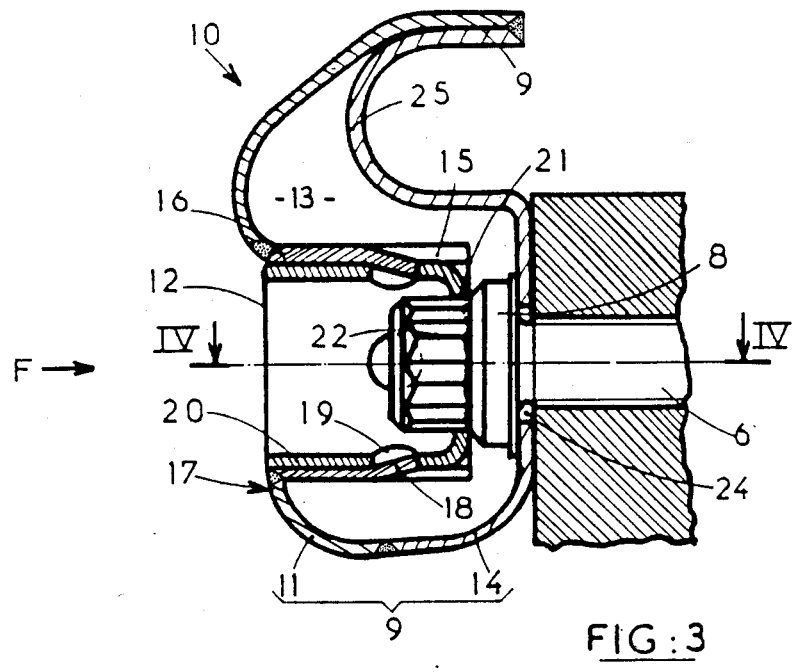
FIG:3
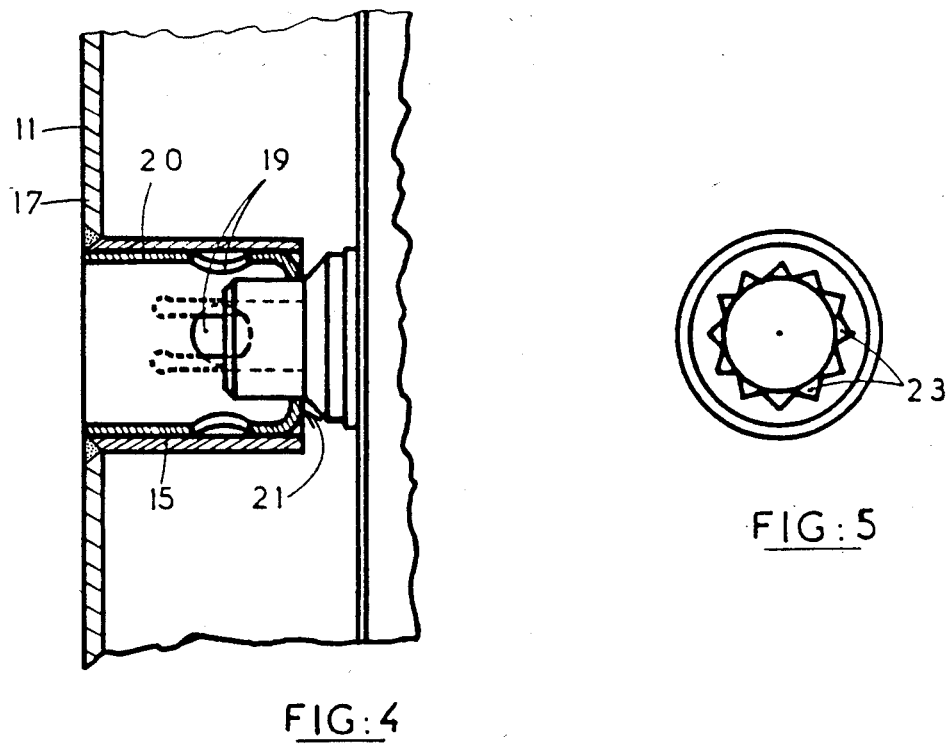
FIG:4
FIG:5

SCREWED ATTACHMENT OF A BODY OF REVOLUTION TO AN ANNULAR FLANGE IN A TURBINE ENGINE

BACKGROUND OF THE INVENTION

1. Field of the invention

The present invention relates to a screwed attachment to an annular flange in a turbine engine in which the heads of the screws are covered by an annular fairing or bolt guard. When screws are used for fixing an element on an annular flange, particular in turbine engine applications, it is necessary, when the heads of the screws are located in a streamline flow of air or gas, to cover them with an annular fairing or bolt guard in order to avoid harmful disturbances in the flow.

2. Summary of the prior art

U.S. Pat. No. 3,727,660 describes an example of an application to a compressor in which a bolt guard is used and is furthermore arranged in such a way as to ensure retention of the elements in the event of accidental unscrewing or loss of an element for any reason in order thus to avoid such an element becoming entrained by the flow of gases and thereby causing any damage, which could be considerable. Despite its advantages, however, the solution proposed necessitates total caging of all the bolts which in some applications may present drawbacks with regard to the fitting and dismantling operations, particularly maintenance operations in which it is necessary to deal with only a single bolt, for example.

SUMMARY OF THE INVENTION

The aim of the invention is to provide a more satisfactory way of forming a screwed attachment including a bolt guard, which does not suffer from the drawbacks of the known solutions. To this end, according to the invention, there is provided attachment means for fixing a body of revolution to an annular flange in a turbine engine, comprising a plurality of evenly distributed screws, each of said screws having a head provided with teeth disposed around a peripheral portion thereof, an annular fairing forming a bolt guard over the heads of said screws, said bolt guard having means defining accedd holes to said screws in the face of said bolt guard opposite said screws, a plurality of first tubular sockets within said bolt guard and respectivley aligned with said screws, said first sockets being wider than the heads of said screws and being rigidly fixed to said bolt guard in the region of said access holes, and a plurality of second tubular sockets respectively disposed within said first sockets and each having an inturned downstream edge impressed on and engaged with said teeth on the head of the respective screw, each of said second sockets having at least one aperture in the wall thereof, and each of said first sockets having a slightly inwardly bent tongue cooperating with said aperture in said second socket to retain said second socket in said first socket.

Further characteristics and advantages of the invention will become apparent from the following description of a preferred embodiment of the invention with reference to the attached drawings.

BRIEF DESCRIPTION OF THE DRAWINGS

FIG. 1 is a diagrammatic general view of a turbine engine in which a screwed attachment associated with a bolt guard in accordance with the invention is used and is shown by a cut-away portion, seen as a longitudinal section in a plane passing through the axis of rotation of the turbine engine;

FIG. 2 shows an enlarged view of the cut-away portion I in FIG. 1, seen as a longitudinal section in a plane passing through the axis of rotation of the turbine engine;

FIG. 3 is an enlarged view of a detail from FIG. 2 illustrating the attachment shown in FIGS. 1 and 2;

FIG. 4 shows a section on the line IV-IV in FIG. 3; and

FIG. 5 is a partial view of the attachment shown in FIG. 3, looking in the direction indicated by the arrow F.

DESCRIPTION OF THE PREFERRED EMBODIMENT

The turbine engine 1 shown diagrammatically in FIG. 1 comprises, at the turbine output, an exhaust casing 2 on the downstream side of which is mounted a jet pipe (not shown in the drawings). As shown in greater detail in FIG. 2, the exhaust casing 2 comprises a hub 3 carrying on its upstream side an annular flange 4 provided with evenly distributed screw-threaded fixing holes 5. These holes 5 receive screws 6 which, in the embodiment shown in the drawings, are intended for fixing a ventilation cover 7 on the said flange 4. The heads 8 of the screws 6 are covered by an annular fairing which is made from sheet metal and is shaped to ensure good aerodynamic conditions for the flow of gases, the fairing constituting a bolt guard 9. The attachment means 10 in accordance with the invention and comprising the bolt guard 9 and screws 6 is shown in greater detail in FIGS. 3 and 5. In line with each screw 6 the bolt guard 9 has an access hole 12 in the outer face of the fairing. In the annular space 13 within the bolt guard 9, situated between its outer face 11 and its inner face 14 and in which the heads 8 of the screws 6 are accommodated, there are first cylindrical sockets 15 rigidly fixed to the said outer face 11. In the embodiment shown, each socket 15 is welded at one end 16 to the circular edge 17 of a respective access hole 12. The two parts 11 and 14 of the bolt guard 9 may also be welded to each other to facilitate manufacture. Each of the sockets 15 has two symmetrically arranged, slightly inwardly bent, lateral tongues 18, which may be formed by making cut-outs in the socket 15. These tongues 18 are arranged to cooperate with apertures 19 provided in the side of a second socket 20 fitted within the first socket 15, and in this example there are four such apertures 19. The inner end of each second socket 20 has an inturned portion 21 which cooperates with the end 22 of the screw head 8, which has a serrated cross-section comprising, for example, twelve teeth 23. The method of mounting the assembly which has just been described is as follows. The bolt guard 9 with the internal sockets 15 is positioned over the members which are to be assembled, ie. the ventilation cover 7 and the annular flange 4 of the exhaust casing 2, and the screws 6 are inserted and tigthened in the screw-threaded holes 5 of the said flange, passing through the access holes 12 and through fixing holes 24 provided in the inner part 14 of the bolt guard 9 so that the heads 8 of the screws 6 bear on the edges of these holes 24. The second sockets 20 are then inserted into the first sockets 15 in the bolt guard 9 via the access holes 12 and are rotated so that two of the holes 19 are aligned with the tongues 18.

Each socket 20 is then pushed inwards so that the inturned portion 21 is forced over the end 22 of the screw head 8 and until the tongues 18 of the first socket 15 enter and engage with the apertures 19 of the socket 20. The teeth 23 on the screw head deform the metal of the inturned portion 21 of the socket 20 to the extent that they form an impression therein. The outcome of the measures described is that each screw 6 is rotationally locked, so that any accidental loosening is avoided, by the interlocking of the teeth 23 on the head 8 of the screw with the inturned part 21 of the respective socket 20. Furthermore, if, for example as the result of a maintenance fault having produced wear and tear on any of the said second sockets 20 after several fitting and dismantling operations, there is any accidental slackening of the respective screw 6, the screw is still retained by the second socket 20 which remains rigid with the bolt guard 9 thanks to the tongues 18 of the surrounding first socket 15. In the embodiment described and shown in the drawings, the bolt guard 9 also comprises, on the downstream side, an annular groove 25 which receives the upstream edges 26 of heat protecting tiles 27 on the hub 3 of the exhaust casing of the turbine engine.

What is claimed is:

1. Attachment means for fixing a body of revolution to an annular flange in a tubular engine, comprising a plurality of evenly distributed screws, each of said screws having a head provided with teeth disposed around a peripheral portion thereof, an annular fairing forming a bolt guard over the heads of said screws, said bolt guard having means defining access holes to said screws in the face of said bolt guard opposite said screws, a plurality of first tubular sockets within said bolt guard and respectively aligned with said screws, said first sockets being wider than the heads of said screws and being rigidly fixed ot said bolt guard in the region of said access holes, and a plurality of second tubular sockets respectively disposed within said first sockets and each having an inturned downstream edge impressed on and engaged with said teeth on the head of the respective screw, each of said second sockets having at least one aperture in the wall thereof, and each of said first sockets having a slightly inwardly bent tongue cooperating with said aperture in said second socket to retain said second socket in said first socket.

2. Attachment means according to claim 1, wherein said bolt guard is formed by two welded parts, and said first tubular sockets are welded at one end to the edges of said access holes in the outer part of said bolt guard.

3. Attachment means according to claim 1, wherein said body of revolution is constituted by a ventilation cover and said annular flange is located on the upstream side of a hub of an exhaust casing of said turbine engine, said hub having heat protection tiles, and said bolt guard including on its downstream side an annular groove accommodating the upstream edge of said tiles.

4. Attachment means according to claim 1, wherein said first and second sockets are cylindrical.

5. Attachment means according to claim 1, wherein each of said first sockets is provided with two symmetrically arranged, inwardly bent tongues, and each of said second sockets is provided with four apertures capable of receiving said tongues.

6. Attachment means according to claim 1, wherein the head of each of said screws is provided with twelve teeth.

* * * * *

UNITED STATES PATENT AND TRADEMARK OFFICE
CERTIFICATE OF CORRECTION

PATENT NO. : 4,904,156

DATED : February 27, 1990

INVENTOR(S) : ERIC TOUZE

It is certified that error appears in the above-identified patent and that said Letters Patent is hereby corrected as shown below:

Column 2, line 35, change "Figures 3 and 5" to
-- Figures 3 to 5 --.

Column 4, line 2, change "fixed ot said" to
-- fixed to said --.

Signed and Sealed this

Second Day of July, 1991

*Attest:*

HARRY F. MANBECK, JR.

*Attesting Officer*    *Commissioner of Patents and Trademarks*